United States Patent
Park et al.

(10) Patent No.: US 8,512,910 B2
(45) Date of Patent: Aug. 20, 2013

(54) SOLID OXIDE ELECTROLYTE, SOLID OXIDE FUEL CELL CONTAINING THE SOLID OXIDE ELECTROLYTE, AND METHOD OF PREPARING THE SOLID OXIDE ELECTROLYTE

(75) Inventors: Hee-jung Park, Suwon-si (KR); Sang-mock Lee, Yongin-si (KR); Chan Kwak, Yongin-si (KR); Soo-yeon Seo, Seoul (KR); Yong-ho Choa, Seongnam-si (KR)

(73) Assignees: Samsung Electroncis Co., Ltd. (KR); Samsung SDI Co., Ltd. (KR); Industry-University Cooperation Foundation Hanyang University (KR)

( * ) Notice: Subject to any disclaimer, the term of this patent is extended or adjusted under 35 U.S.C. 154(b) by 266 days.

(21) Appl. No.: 12/889,047

(22) Filed: Sep. 23, 2010

(65) Prior Publication Data
US 2011/0081598 A1    Apr. 7, 2011

(30) Foreign Application Priority Data
Oct. 7, 2009    (KR) ................. 10-2009-0095266

(51) Int. Cl.
*H01M 8/12*    (2006.01)
*C04B 35/48*    (2006.01)

(52) U.S. Cl.
USPC .................. 429/496; 501/105; 264/618

(58) Field of Classification Search
USPC ................ 429/496; 501/105; 264/618
See application file for complete search history.

(56) References Cited

U.S. PATENT DOCUMENTS

| | | | |
|---|---|---|---|
| 3,573,107 A * | 3/1971 | Pâris et al. | 429/496 X |
| 4,365,011 A * | 12/1982 | Bernard et al. | 264/618 |
| 4,767,518 A | 8/1988 | Maskalick | |
| 5,385,874 A | 1/1995 | Renlund et al. | |
| 5,413,880 A * | 5/1995 | Ishii et al. | 429/496 X |
| 7,745,031 B2 * | 6/2010 | Larsen et al. | 429/496 X |
| 2005/0214616 A1 | 9/2005 | Kumar et al. | |

FOREIGN PATENT DOCUMENTS

| | | |
|---|---|---|
| EP | 1528119 A1 | 5/2005 |
| JP | 7147167 A | 6/1995 |

OTHER PUBLICATIONS

Fergus, Jeffrey W., "Electrolytes for solid oxide fuel cells," Journal of Power Sources, vol. 162, 2006, pp. 30-40.

He, H.P., et al., "Sulphur tolerant shift reaction catalysts for nickel-based SOFC anode," Solid State Ionics, vol. 179, 2008, pp. 1478-1482.

Lim, Tak-Hyoung, et al., "Operating characteristics of a 5 kW class anode-supported planar SOFC stack for a fuel cell/gas turbine hybrid system," International Journal of Hydrogen Energy, vol. 33, 2008, pp. 1076-1083.

Kudo, T., et al., "Solid State Ionics," Book Reviews, Advanced Materials, vol. 3, No. 10, 1991, p. 518.

Waldbillig, David, et al., "Thermal analysis of the cyclic reduction and oxidation behaviour of SOFC anodes," Solid State Ionics, vol. 176, 2005, pp. 847-859.

* cited by examiner

*Primary Examiner* — Stephen J. Kalafut
(74) *Attorney, Agent, or Firm* — Cantor Colburn LLP

(57) ABSTRACT

A solid oxide electrolyte including an oxygen ion conducting solid solution, wherein the solid solution is represented by Formula 1 below:

$$Zr_{1-x-y-z}Ma_xMb_yMc_zO_{2-\delta} \quad \text{Formula 1}$$

wherein x is greater than 0 and less than about 0.3, y is greater than 0 and less than about 0.1, z is greater than 0 and less than about 0.1, δ is selected to make the solid solution ionically neutral, Ma, Mb, and Mc are each independently a metal selected from the group consisting of elements of Groups 3, Groups 5 through 13, and Group 14, and an ionic radius of each of $Ma^{+3}$, $Mb^{+3}$, and $Mc^{+3}$ are different from each other.

20 Claims, 3 Drawing Sheets

SOLID OXIDE ELECTROLYTE, SOLID OXIDE FUEL CELL CONTAINING THE SOLID OXIDE ELECTROLYTE, AND METHOD OF PREPARING THE SOLID OXIDE ELECTROLYTE

CROSS-REFERENCE TO RELATED APPLICATIONS

This application claims priority to Korean Patent Application No. 10-2009-0095266, filed on Oct. 7, 2009, and all the benefits accruing therefrom under 35 U.S.C. §119, the content of which in its entirety is herein incorporated by reference.

BACKGROUND

1. Field

The present disclosure relates to a solid oxide electrolyte, a solid oxide fuel cell including the same, and a method of preparing the solid oxide electrolyte.

2. Description of the Related Art

Fuel cells are regarded as one of various alternative energy sources. Fuel cells can be categorized as a polymer electrolyte membrane fuel cell ("PEMFC"), a phosphoric acid fuel cell ("PAFC"), a molten carbonate fuel cell ("MCFC"), or a solid oxide fuel cell ("SOFC"), based on the type of electrolyte used.

An SOFC uses a solid oxide having ionic conductivity as an electrolyte. SOFCs have high efficiency and high durability, use various kinds of fuels, and can be manufactured at low cost.

An SOFC unit cell includes a membrane-electrode-assembly ("MEA") which includes a solid oxide electrolyte and electrodes. Because SOFCs operate at a high temperature, such as 400 to 1200° C., the solid oxide electrolyte desirably has excellent sintering properties, high mechanical strength, and a wide range of driving temperature. For example, a solid oxide electrolyte having such properties may be yttria stabilized zirconia ("YSZ").

In addition, an actual output voltage of an SOFC may be lower than a theoretical voltage due to polarization occurring inside the solid electrolyte or the electrodes. For example, the actual output voltage may be represented by the Equation below:

$$V = V_{oc} - i(R_{electrolyte} + R_{cathode} + R_{anode}) - \eta_{cathode} - \eta_{anode} \quad \text{Equation}$$

wherein V denotes the actual output voltage, $V_{oc}$ denotes an open circuit voltage, $\eta_{cathode}$ and $\eta_{anode}$ denote electrodic polarization of the cathode and anode, respectively, I denotes a current, and $R_{electrolyte}$, $R_{cathode}$, and $R_{anode}$ denote resistance of an electrolyte, resistance of a cathode, and resistance of an anode, respectively. Thus $i(R_{electrolyte} + R_{cathode} + R_{anode})$ denotes ohmic resistance polarization.

As shown in the equation above, as $R_{electrolyte}$ increases, V is decreases. Thus, in order to increase V, the solid oxide electrolyte needs to have a low $R_{electrolyte}$, that is, a high ion conductivity. YSZ has low ion conductivity.

Accordingly, there remains a need for a solid oxide electrolyte having high ion conductivity in addition to excellent sintering properties, high mechanical strength, and a wide range of driving temperature.

SUMMARY

Provided is a solid oxide electrolyte including an oxygen ion-conducting solid solution.

Provided is solid oxide fuel cell including the solid oxide electrolyte.

Provided is a method of preparing the solid oxide electrolyte.

Additional aspects, features, and advantages will be set forth in part in the description which follows and, in part, will be apparent from the description.

According to an aspect, a solid oxide electrolyte includes an oxygen ion conducting solid solution, wherein the solid solution is represented by Formula 1 below:

$$Zr_{1-x-y-z}Ma_xMb_yMc_zO_{2-\delta} \qquad \text{Formula 1}$$

wherein x is greater than 0 and less than about 0.3, y is greater than 0 and less than about 0.1, z is greater than 0 and less than about 0.1, and δ is selected to make the solid solution ionically neutral, Ma, Mb, and Mc are each independently a metal selected from the group consisting of elements of Group 3, Groups 5 through 13, and Group 14, and an ionic radius of each of $Ma^{+3}$, $Mb^{+3}$, and $Mc^{+3}$ are different from each other.

According to another aspect, a solid oxide fuel cell includes: a cathode; an anode; and the solid oxide electrolyte interposed between the cathode and the anode.

Also disclosed is a method of preparing a solid oxide electrolyte. The method includes mixing a zirconium precursor, three or more dopant metal precursors, and a solvent to prepare a precursor mixture; dispersing the precursor mixture; and calcining the precursor mixture under an oxygen atmosphere to obtain the solid oxide electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
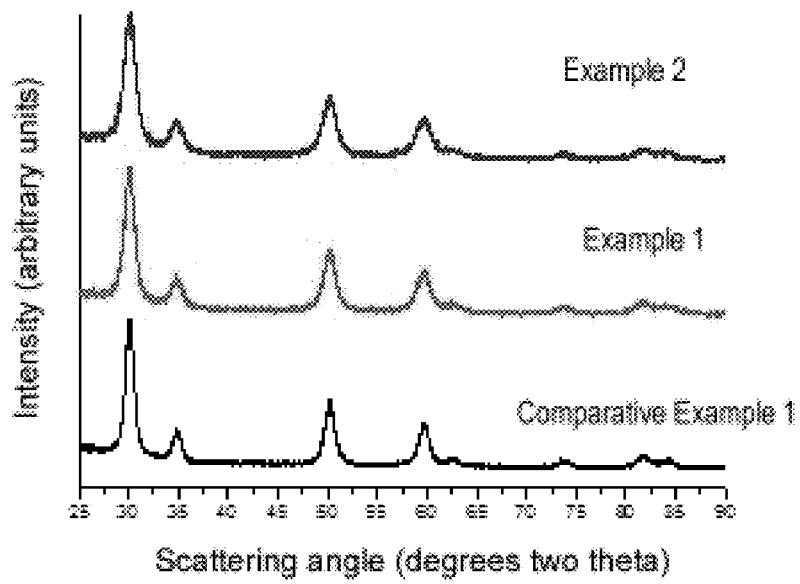
FIG. 1 is a graph of intensity (arbitrary units) versus scattering angle (degrees two theta, 2θ) which shows X-ray diffraction results of calcined products prepared in a calcining process according to Comparative Example 1 and Examples 1 and 2.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "Group" refers to a Group of the periodic table of the elements according to the International Union of Pure and Applied Sciences ("IUPAC") 1-18 group classification system.

A solid oxide electrolyte, a solid oxide fuel cell including the solid oxide electrolyte, and a method of preparing the solid oxide electrolyte will be disclosed in further detail.

A solid oxide electrolyte according to an embodiment may have improved oxygen ion ($O^{2-}$)-conducting properties (e.g., oxygen ion conductivity) due to inclusion of a solid solution which conducts an oxygen ion therein, wherein the solid solution may be represented by Formula 1 below:

$$Zr_{1-x-y-z}Ma_xMb_yMc_zO_{2-\delta} \qquad \text{Formula 1}$$

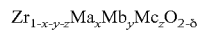

wherein x is greater than 0 and less than about 0.3, y is greater than 0 and less than 0.1, z is greater than 0 and less than 0.1, $\delta$ is selected to make the solid solution ionically neutral, Ma, Mb, and Mc are each independently a metal selected from the group consisting of elements of Group 3, Groups 5 through 13, and Group 14, and an ionic radius of each of $Ma^{+3}$, $Mb^{+3}$, and $Mc^{+3}$ may be different from each other. In an embodiment, $\delta$ represents an oxygen vacancy. For example, in a representative embodiment, $\delta=(x+y+z)/2$.

Hereinafter, while not wanting to be bound by theory, disclosed are possible reasons for the higher oxygen ion conductivity of the solid solution. Thus, this description is presented only for helping one of ordinary skilled in the art to better understand this disclosure and shall not limit the scope of the invention.

In the solid solution, the conductivity of the oxygen ion is proportional to the amount of oxygen vacancies, wherein the oxygen vacancy is a charge carrier. The oxygen vacancy is formed by substituting for Zr, which has an oxidation number of +4 in the solid solution, another metal having an oxidation number of +3. In the solid solution, if a substituting metal has an ionic radius that is substantially smaller or larger than the ionic radius of Zr, the Zr site may not be substituted with the substituting metal due to the difference in ionic radius. However, if a smaller metal, which has an ionic radius that is substantially smaller than that of Zr, and a larger metal, which has an ionic radius that is substantially greater than that of Zr, are used together, the sum of the ionic radii of the smaller and larger metals may be similar to those of two Zr atoms, and thus two Zr sites may be substituted with the metals. The substitution may thus lead to the formation of an oxygen vacancy and thus, a conductivity of the oxygen ion may be increased.

In a solid oxide electrolyte according to an embodiment, a space group of the crystal structure of the solid solution may be $Fm\overline{3}m$. For example, the solid solution may have a fluorite crystal structure. For example, the solid solution may have a structure similar to the fluorite crystal structure. In an embodiment, the solid oxide electrolyte has a cubic structure.

In the solid solution, the ionic radius of $Mb^{+3}$ may be greater than each of the ionic radius of $Zr^{+4}$ and the ionic radius of $Ma^{+3}$, and the ionic radius of $Mc^{+3}$ may be smaller than each of the ionic radius of $Zr^{+4}$ and the ionic radius of $Ma^{+3}$. That is, the ionic radius of $Ma^{+3}$ may be relatively similar to the ionic radius (e.g., 0.079 nanometers, m) of $Zr^{+4}$. Alternatively, the ionic radius of $Mb^{+3}$ may be greater than (e.g., >) the ionic radius of $Zr^{+4}$, or the ionic radius of $Ma^{+3}$ may be greater than (e.g., >) the ionic radius of $Mc^{+3}$.

In the solid solution, the ionic radius of $Ma^{+3}$ may be about 0.075 about 0.096 nm, specifically about 0.08 to about 0.09 nm, more specifically about 0.085 nm, the ionic radius of $Mb^{+3}$ may be equal to or greater than about 0.10 nm, specifically equal to or greater than about 0.105 nm, more specifically equal to or greater than about 0.11 nm, and the ionic radius of $Mc^{+3}$ may be equal to or less than about 0.065 nm, specifically equal to or less than about 0.060, more specifically equal to or less than about 0.055. For example, the ionic radius of $Mb^{+3}$ may be about 0.10 nm to about 0.22 nm, specifically about 0.11 nm to about 0.20 nm, more specifically about 0.12 nm to about 0.18 nm. For example, the ionic radius of $Mc^{+3}$ may be about 0.065 nm to about 0.01 nm, specifically about 0.060 nm to about 0.02 nm, more specifically about 0.055 nm to about 0.03 nm.

In the solid solution, Ma may include, but is not limited to, at least one selected from the group consisting of yttrium (Y), scandium (Sc), ytterbium (Yb), gadolinium (Gd), samarium (Sm), indium (In), lutetium (Lu), and dysprosium (Dy), and a combination thereof; Mb may include, but is not limited to, at least one selected from the group consisting of lanthanum (La), bismuth (Bi), praseodymium (Pr), and actinium (Ac), and a combination thereof, and Mc may include, but is not limited to, at least one selected from the group consisting of aluminum (Al), gallium (Ga), and boron (B), and a combination thereof. In addition, each of Ma, Mb, and Mc may be any metal which has the ionic radius described above and is available in the art.

In a solid oxide electrolyte according to another embodiment, a grain conductivity of the solid solution may be equal to or greater than about $3.70 \times 10^{-4}$ S/cm, specifically equal to or greater than about $4 \times 10^{-4}$ S/cm, more specifically equal to or greater than about $4 \times 10^{-3}$ S/cm at a temperature of equal to or less than about 450° C. For example, the grain conductivity of the solid solution may be equal to or greater than about $5.0 \times 10^{-4}$ S/cm. For example, the grain conductivity of the solid solution may be equal to or greater than about $7.0 \times 10^{-4}$ S/cm.

In a solid oxide electrolyte according to another embodiment, the solid solution may be represented by Formula 2 below:

$$Zr_{1-x-y-z}Y_xLa_yAl_zO_{2-\delta}$$ Formula 2 wherein x is greater than 0 and less than about 0.3, y is greater than 0 and less than about 0.1, z is greater than 0 and less than about 0.1, and δ is selected to make the solid solution ionically neutral. For example, in the solid oxide electrolyte, x is greater than about 0.1 and less than about 0.2, y is greater than about 0.005 and less than about 0.3, and z is greater than about 0.005 and less than 0.03. In a representative embodiment, the solid solution may be selected from the group consisting of $Zr_{0.823}Y_{0.157}La_{0.01}Al_{0.01}O_{1.9115}$, $Zr_{0.798}Y_{0.152}La_{0.025}Al_{0.025}O_{1.899}$, $Zr_{0.756}Y_{0.144}La_{0.05}Al_{0.05}O_{1.878}$, and a mixture thereof.

The solid solution having high oxygen-ion conductivity disclosed above may also be used in other industrial applications in addition to the solid oxide electrolytes.

A solid oxide fuel cell according to an embodiment may include a cathode; an anode; and an electrolyte interposed between the cathode and the anode, wherein the electrolyte may be any one of the solid oxide electrolytes disclosed above. In another embodiment, the electrolyte is a mixture comprising at least one of the electrolytes disclosed herein. The solid oxide fuel cell may comprise a stack of unit cells. For example, the solid oxide fuel cell may have a stack of unit cells, wherein each unit cell includes a membrane-electrode-assembly ("MEA") including a cathode, an anode, and a solid oxide electrolyte. The unit cells may be disposed in series, and adjacent unit cells may be separated from each other by a separator which electrically connects the unit cells.

A material for forming the cathode may be, for example, a metal oxide having a perovskite-type crystal structure, such as a metal oxide selected from the group consisting of $(Sm,Sr)CoO_3$, $(La,Sr)MnO_3$, $(La,Sr)CoO_3$, $(La,Sr)(Fe,Co)O_3$, and $(La,Sr)(Fe,Co,Ni)O_3$, and a combination thereof. The metal oxide may be used alone or at least two of these may be used together. The material for forming the cathode may also be a noble metal, such as a metal selected from the group consisting of platinum, ruthenium, and palladium, and a combination thereof. The material for forming the cathode may also be a lanthanum manganite doped with at least one selected from the group consisting of strontium, cobalt, and iron. Examples of the doped lanthanum manganite include $La_{0.8}Sr_{0.2}MnO_3$ ("LSM"), or $La_{0.6}Sr_{0.4}Co_{0.8}Fe_{0.2}O_3$ ("LSCF"). However, the cathode material is not limited thereto.

The electrolyte may include the solid solution having high ion conductivity. In addition, the electrolyte may further include a commercially available solid oxide electrolyte material. For example, the electrolyte may further include at least one complex metal oxide selected from the group consisting of zirconium oxide, cerium oxide, and lanthanum oxide, and a combination thereof. Examples of the complex metal oxide include yttria stabilized zirconia ("YSZ"), scandia stabilized zirconia ("ScSZ"), samaria doped ceria ("SDC"), or gadolinia doped ceria ("GDC"). The thickness of the electrolyte may be about 10 nm to about 100 micrometers, specifically about 100 nm to about 50 micrometers, more specifically about 1 micrometer to about 25 micrometers.

A material for forming the anode may be a mixed cermet including a powder of the material for forming the anode and nickel oxide. The anode may further include activated carbon. However, the anode material is not limited thereto.

A method of preparing a solid oxide electrolyte according to an embodiment includes mixing a zirconium precursor, three or more dopant metal precursors, and a solvent to prepare a precursor mixture; dispersing, and calcining the precursor mixture under an oxygen atmosphere to obtain a calcined product.

The solvent not limited and can be determined by one of ordinary skill in the art without undue experimentation. For example, the solvent may be water.

The three or more dopant metal precursors may include at least one metal precursor selected from the group consisting of Y, Sc, Yb, Gd, Sm, In, Lu, and Dy, and a combination thereof, at least one metal precursor selected from the group consisting of La, Bi, Pr, and Ac, and a combination thereof, and at least one metal precursor selected from the group consisting of Al, Ga, and B, and a combination thereof.

The mixing of the precursors and the solvent may be performed by mechanical stirring or ultrasonic stirring. However, the mixing method is not limited thereto and any method available in the art may be used.

The precursor mixture may be sprayed using, for example, an ultrasonic spray. However, the spraying method is not limited thereto and any method available in the art may be used.

The sprayed precursor mixture may be carried by a carrier gas such as oxygen gas. However, the carrier gas is not limited to oxygen gas and may be any gas that allows formation of oxides during the calcination.

The calcination temperatures of the precursor mixture may be about 300 to about 600° C. and about 700 to about 1100° C., specifically about 350 to about 550° C. and about 750 to about 1050° C., more specifically about 400 to about 500° C. and about 800 to about 1000° C., but is not limited thereto. The calcination temperature may be appropriately controlled as desired.

For example, a zirconium precursor, a metal Ma precursor, a metal Mb precursor, and a metal Mc precursor may be mixed in pure water to prepare a precursor mixture. Then, the precursor mixture may be loaded into a calcination furnace by a carrier gas comprising oxygen by spraying using an ultrasonic spray to provide fine droplets of a solution or suspension. The calcination furnace may be divided into one or more, or specifically two temperature regions: a first temperature region at a temperature of about 300 to about 600° C., specifically about 350 to about 550° C., more specifically about 400 to about 500° C., and a second temperature region at a temperature of about 700 to about 1100° C., specifically about 750 to about 1050° C., more specifically about 800 to about 1000° C. The precursor mixture may be decomposed while passing through the calcination furnace for equal to or less than about 10 seconds, specifically equal to or less than about 8 seconds, more specifically equal to or less than about 5 seconds, thereby obtaining a calcined powder product.

In addition, the method may further include sintering the calcined product to obtain a sintered product. The sintering may be performed at a temperature of equal to or greater than 800° C., specifically equal to or greater than about 900° C., more specifically equal to or greater than 1000° C. and at a pressure of about 0.5 to about 10 atmospheres, specifically about 0.75 to about 5 atmospheres, more specifically at equal to or greater than about 1 atmosphere (atm). For example, the sintering may be performed at a temperature of about 800 to about 1700° C. and at a pressure of about atmospheric pressure to about 1 gigaPascal (GPa).

In the method, the zirconium precursor may be a zirconium nitrate. The dopant metal precursor may each independently be a nitrate of a dopant metal. For example, the metal Ma precursor, the metal Mb precursor, and the metal Mc precursor may be a nitrate of metal Ma, a nitrate of metal Mb, and a nitrate of metal Mc, respectively.

Representative embodiments will be disclosed in further detail with reference to the following examples. These examples are for illustrative purposes only, and are not intended to limit the scope of the disclosed embodiments.

Preparation of Cathode Active Material

Comparative Example 1

Preparation of $Zr_{0.84}Y_{0.16}O_{2-\delta}$

Calcining Process

Zirconium nitrate and yttrium nitrate were added to 100 milliliters (ml) of ultra pure water in such amounts that a concentration of $Zr_{0.84}Y_{0.16}O_{2-\delta}$ was 0.2 molar (M) and a target composition ratio was obtained and then dissolved therein, thereby preparing a precursor solution. The precursor solution was carried into a calcination furnace by an oxygen carrier gas flowing at 1.5 Liters per minute by spraying using an ultrasonic spray. The calcination furnace was divided into two regions: a 400° C. region and a 900° C. region. The precursor solution was decomposed and calcined while passing through the calcination furnace together with the oxygen carrier gas for a time period of about 2 to about 10 seconds, thereby obtaining $Zr_{0.84}Y_{0.16}O_{1.92}$ powder as a calcined product.

Sintering Process

The $Zr_{0.84}Y_{0.16}O_{1.92}$ powder obtained by the calcining was sintered using a spark plasma sintering ("SPS") apparatus at a temperature of 1000° C. and at a pressure of 80 megaPascals (MPa), thereby obtaining sintered product pellets. A relative density of the sintered product was 98%. The obtained sintered product will be referred to as Comparative Sample 1.

Example 1

Preparation of $Zr_{0.823}Y_{0.157}La_{0.01}Al_{0.01}O_{1.9115}$

Calcining Process

A calcined product was prepared in the same manner as in Comparative Example 1, except that zirconium nitrate, yttrium nitrate, lanthanum nitrate, and aluminum nitrate were added to 100 ml of ultra pure water in such amounts that a concentration of $Zr_{0.823}Y_{0.157}La_{0.01}Al_{0.01}O_{1.9115}$ was 0.2 M and a target composition ratio was obtained and then dissolved therein, thereby preparing a precursor solution.

$Zr_{0.823}Y_{0.157}La_{0.01}Al_{0.01}O_{1.9115}$ powder was obtained.

Sintering Process

A sintered product was prepared in the same manner as in Comparative Example 1. The obtained sintered product will be referred to as Sample 1.

Example 2

Preparation of $Zr_{0.798}Y_{0.152}La_{0.025}Al_{0.025}O_{1.899}$

Calcining Process

A calcined product was prepared in the same manner as in Comparative Example 1, except that zirconium nitrate, yttrium nitrate, lanthanum nitrate, and aluminum nitrate were added to 100 ml of ultra pure water in such amounts that a concentration of $Zr_{0.798}Y_{0.152}La_{0.025}Al_{0.025}O_{1.899}$ was 0.2 M and a target composition ratio was obtained and then dissolved therein, thereby preparing a precursor solution. The present example is different from Example 1 only in the precursor composition ratio.

$Zr_{0.798}Y_{0.152}La_{0.025}Al_{0.025}O_{1.899}$ powder was obtained.

Sintering Process

A sintered product was prepared in the same manner as in Comparative Example 1. The obtained sintered product will be referred to as Sample 2.

X-ray Diffraction Test

Evaluation Example 1

X-ray diffraction tests were performed on the calcined powder obtained by the calcining according to Comparative Example 1 and Examples 1, and 2, and the results are shown in FIG. 1. Referring to FIG. 1, all of the calcined powders had a single phase of cubic stabilized zirconia. That is, the calcined powders showed a fluorite crystal structure.

Figure 2:
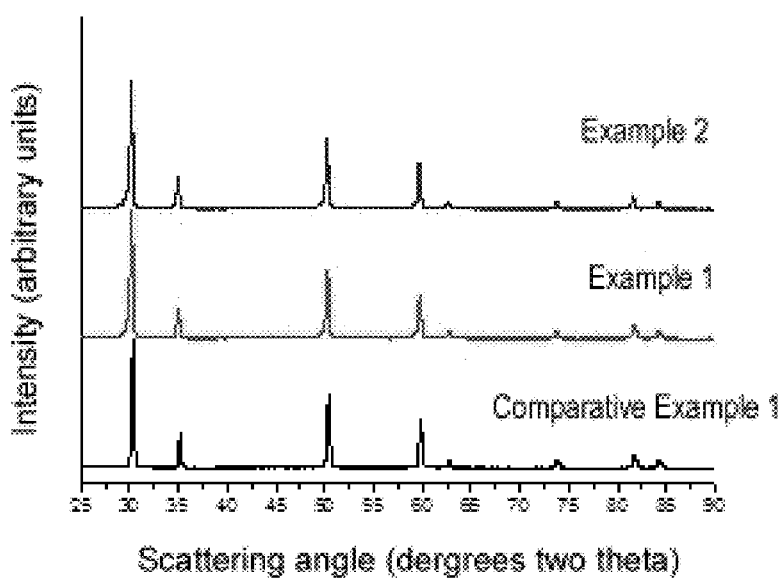
FIG. 2 is a graph of intensity (arbitrary units) versus scattering angle (degrees two theta, 2θ) which shows X-ray diffraction results of sintered products prepared in a sintering process according to Comparative Example 1 and Examples 1 and 2.

Then, X-ray diffraction tests were further performed on the calcined products in order to identify whether the sintering induces any phase change or a novel phase formation of the calcined products, and the results are shown in FIG. 2. Referring to FIG. 2, a phase change or a novel phase formation was not observed while peaks were narrowed due to grain growth and improvement of crystallinity in the sintering process.

Ion Conductivity Evaluation

Evaluation Example 2

Figure 3A:
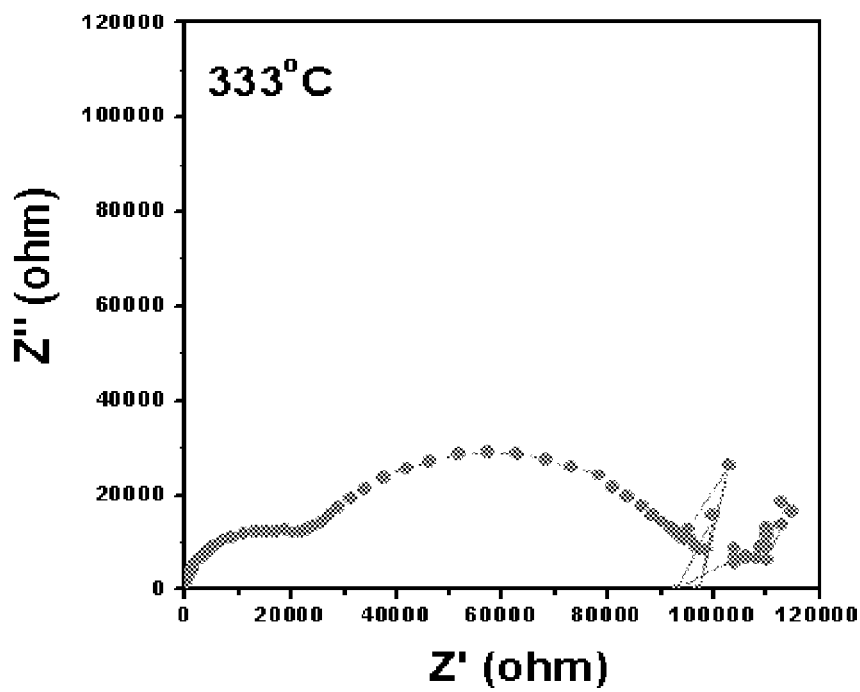
FIG. 3A is graph of imaginary impedance (Z", ohms) versus real impedance (Z', ohms) showing a Nyquist plot of impedance results of a pellet prepared in a sintering process according to Comparative Example 1.
Figure 3B:
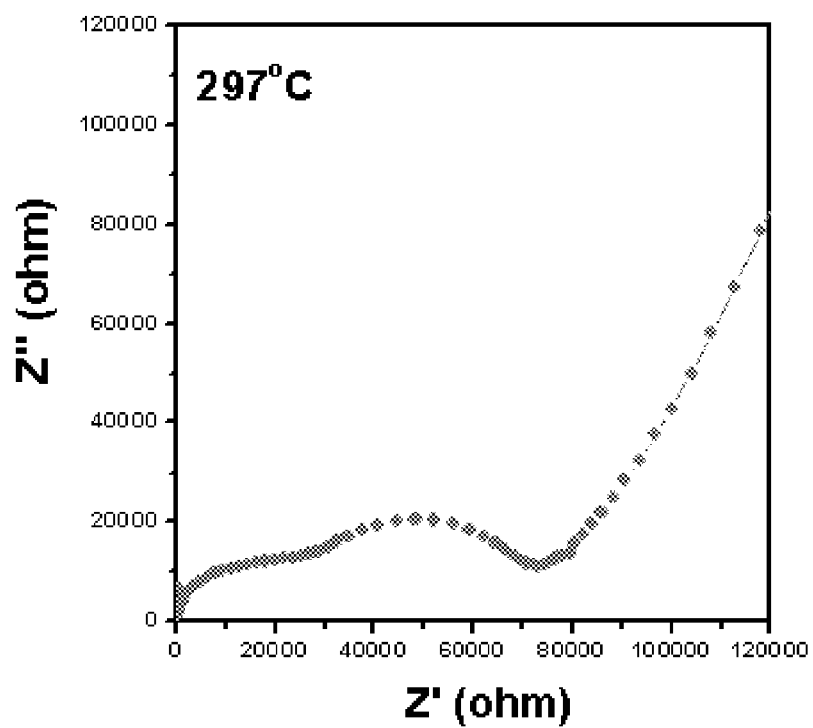
FIG. 3B is graph of imaginary impedance (Z", ohms) versus real impedance (Z', ohms) showing a Nyquist plot of impedance results of a pellet prepared in a sintering process according to Example 1.
Figure 3C:
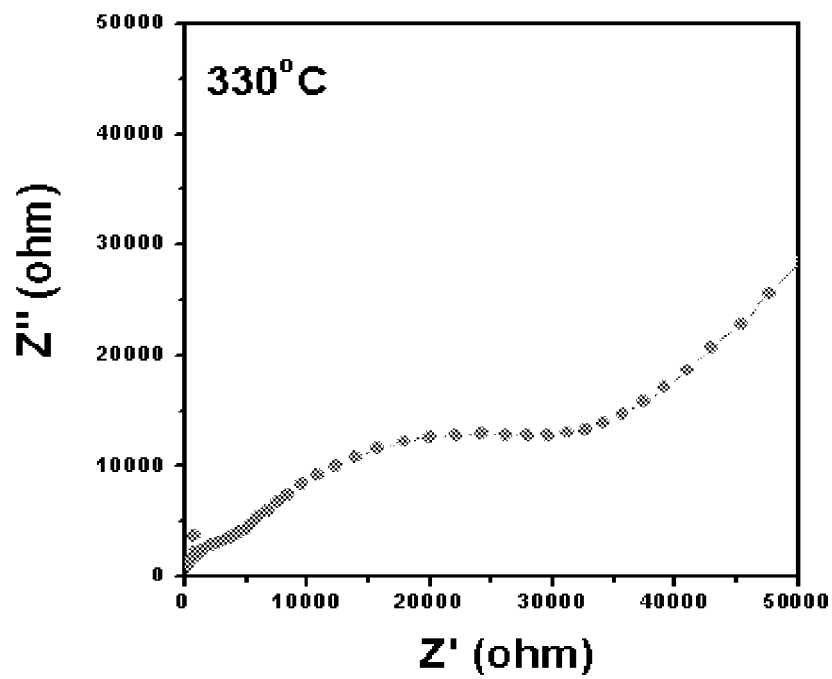
FIG. 3C is graph of imaginary impedance (Z", ohms) versus real impedance (Z', ohms) showing a Nyquist plot of impedance results of a pellet prepared in a sintering process according to Example 2.

In order to evaluate ionic conductivity, the samples obtained according to Comparative Example 1 and Examples 1 and 2 were coated with gold (Au) paste by brushing to form an electrode and then the Au-coated samples were heat treated at a temperature of 700° C. for 1 hour in air. Impedance of the samples on which the electrode was formed was measured using a MATERIALSMATES 7260 impedance analyzer according to a 2-probe method. The frequency range used was in the range of about 10 megahertz (MHz) to about 1 MHz. The evaluation was performed under a nitrogen atmosphere at a temperature of about 250 to about 700° C. A Nyquist plot of some of the impedance evaluation results is illustrated in FIG. 3. FIG. 3A is a Nyquist plot of impedance results of pellets prepared in a sintering process according to Comparative Example 1, FIG. 3B is an Nyquist plot of impedance results of pellets prepared in a sintering process according to Example 1, and FIG. 3C is a Nyquist plot of impedance results of pellets prepared in a sintering process according to Example 2. For example, in FIG. 3A, a point at which a plot formed by extrapolating the left most hemisphere contacts the X axis corresponds to a grain resistance, and a point at which a plot formed by extrapolating the middle hemisphere contacts the X axis corresponds to a grain boundary resistance.

From the impedance evaluation results, grain conductivity and grain boundary conductivity were measured. The results are shown in Table 1, and FIG. 4.

TABLE 1

| | Comparative Example 1 [S/cm] | Example 1 [S/cm] | Example 2 [S/cm] |
|---|---|---|---|
| Grain conductivity | $3.62 \times 10^{-4}$ at a temperature of 442° C. | $7.64 \times 10^{-4}$ at a temperature of 449° C. | $6.84 \times 10^{-4}$ at a temperature of 440° C. |
| Grain boundary conductivity | $5.47 \times 10^{-6}$ at a temperature of 442° C. | $1.27 \times 10^{-5}$ at a temperature of 449° C. | $2.16 \times 10^{-5}$ at a temperature of 440° C. |

In Table 1, S/cm refers to siemens per centimeter.

Figure 4:
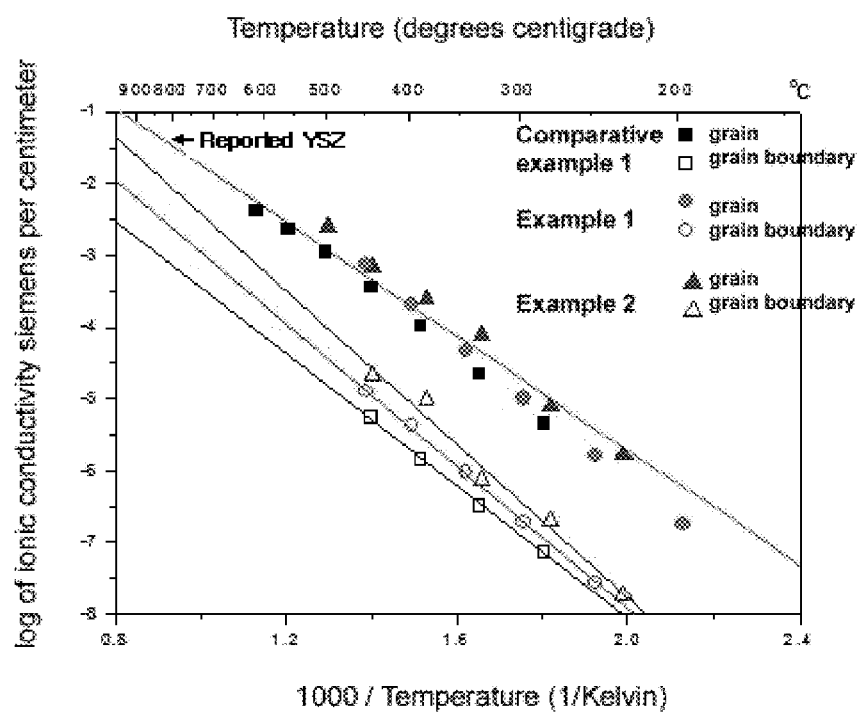
FIG. 4 is a graph of the log of ionic conductivity (Siemens per centimeter) versus the inverse of absolute temperature (1000/T, inverse Kelvin (1/K)) and temperature (degrees centigrade) showing ionic conductivity evaluated using the impedance results of pellets prepared in a sintering process according to Comparative Example 1 and Examples 1 and 2.

Referring to Table 1 and FIG. 4, the samples prepared according to Examples 1 and 2 showed high ionic conductivity at similar temperature, compared to the sample prepared according to Comparative Example 1.

As disclosed above, according to the one or more of the above embodiments, a solid oxide electrolyte has higher ionic conductivity due to inclusion of an oxygen ion-conducting solid solution containing three or more dopants, each having a different ionic radius. A solid oxide fuel cell including the solid oxide electrolyte has higher driving voltage and lower driving temperature.

It should be understood that the exemplary embodiments described therein should be considered in a descriptive sense only, and not for purposes of limitation. Descriptions of features or aspects within each embodiment should typically be considered as available for other similar features or aspects in other embodiments.

What is claimed is:

1. A solid oxide electrolyte comprising:
   an oxygen ion conducting solid solution, wherein the solid solution is represented by Formula 1 below:

$$Zr_{1-x-y-z}Ma_xMb_yMc_zO_{2-\delta} \qquad \text{Formula 1}$$

wherein x is greater than 0 and less than about 0.3, y is greater than 0 and less than about 0.1, z is greater than 0 and less than about 0.1, and δ is selected to make the solid solution ionically neutral;
   Ma and Mc are each independently a metal selected from the group consisting of elements of Group 3 and Groups 5 through 14;
   Mb is a metal selected from the group consisting of elements of Group 3, Groups 5 through 14, and bismuth; and
   an ionic radius of each of $Ma^{+3}$, $Mb^{+3}$, and $Mc^{+3}$ are different from each other.

2. The solid oxide electrolyte of claim 1, wherein a space group of a crystal structure of the solid solution is Fm3̄m.

3. The solid oxide electrolyte of claim 1, wherein the solid solution has a fluorite crystal structure.

4. The solid oxide electrolyte of claim 1, wherein the ionic radius of $Mb^{+3}$ is greater than each of the ionic radius of $Zr^{+4}$ and the ionic radius of $Ma^{+3}$.

5. The solid oxide electrolyte of claim 1, wherein the ionic radius of $Ma^{+3}$ is about 0.075 to about 0.096 nanometers.

6. The solid oxide electrolyte of claim 1, wherein the ionic radius of $Mb^{+3}$ is equal to or greater than about 0.10 nanometers.

7. The solid oxide electrolyte of claim 1, wherein the ionic radius of $Mc^{+3}$ is equal to or less than about 0.065 nanometers.

8. The solid oxide electrolyte of claim 1, wherein the Ma comprises at least one selected from the group consisting of yttrium, scandium, ytterbium, gadolinium, samarium, indium, lutetium, and dysprosium.

9. The solid oxide electrolyte of claim 1, wherein the Mb comprises at least one selected from the group consisting of lanthanum, bismuth, praseodymium, and actinium.

10. The solid oxide electrolyte of claim 1, wherein the Mc comprises at least one selected from the group consisting of aluminum, gallium, and boron.

11. The solid oxide electrolyte of claim 1, wherein grain conductivity of the solid solution is equal to or greater than about $3.70 \times 10^{-4}$ S/cm at a temperature of equal to or less than about 450° C.

12. The solid oxide electrolyte of claim 1, wherein the solid solution is represented by Formula 2 below:

$$Zr_{1-x-y-z}Y_xLa_yAl_zO_{2-\delta} \qquad \text{Formula 2}$$

wherein x is greater than 0 and less than about 0.3, y is greater than 0 and less than about 0.1, z is greater than 0 and less than about 0.1, and δ is selected to make the solid solution ionically neutral.

13. The solid oxide electrolyte of claim 11, wherein x is greater than about 0.1 and less than about 0.2, y is greater than about 0.005 and less than about 0.3, and z is greater than about 0.005 and less than 0.03.

14. The solid oxide electrolyte of claim 1, wherein the solid solution is selected from the group consisting of $Zr_{0.823}Y_{0.157}La_{0.01}Al_{0.01}O_{1.9115}$, $Zr_{0.798}Y_{0.152}La_{0.025}Al_{0.025}O_{1.899}$, and $Zr_{0.756}Y_{0.144}La_{0.05}Al_{0.05}O_{1.878}$.

15. A solid oxide fuel cell comprising:
   a cathode;
   an anode; and
   a solid oxide electrolyte interposed between the cathode and the anode, wherein the solid oxide electrolyte is the solid oxide electrolyte of claim 1.

16. A method of preparing a solid oxide electrolyte, the method comprising:
   mixing a zirconium precursor, three or more dopant metal precursors, and a solvent to prepare a precursor mixture;
   dispersing the precursor mixture; and
   calcining the precursor mixture under an oxygen atmosphere to obtain the solid oxide electrolyte,
   wherein the three or more dopant metal precursors comprise a first dopant metal, a second dopant metal, and a third dopant metal, and wherein an ionic radius of the third dopant metal is smaller than each of the ionic radius of $Zr^{+4}$ and the ionic radius of the first dopant metal.

17. The method of claim 16, further comprising sintering the solid oxide electrolyte to obtain a sintered solid oxide electrolyte.

18. The method of claim 16, wherein the zirconium precursor is a zirconium nitride, and the dopant metal precursors are each a nitride of a dopant metal.

19. The method of claim 16, wherein the solid oxide electrolyte comprises a solid solution represented by Formula 1:

$$Zr_{1-x-y-z}Ma_xMb_yMc_zO_{2-\delta} \qquad \text{Formula 1}$$

wherein x is greater than 0 and less than about 0.3, y is greater than 0 and less than about 0.1, z is greater than 0 and less than about 0.1, and δ is selected to make the solid solution ionically neutral, Ma and Mc are each independently a metal selected from the group consisting of elements of Group and Groups 5 through 14, Mb is a metal selected from the group consisting of elements of Group 3, Groups 5 through 14, and bismuth, an ionic radius of each of $Ma^{+3}$, $Mb^{+3}$, and $Mc^{+3}$ are different from each other, and the ionic radius of $Mc^{+3}$ is smaller than each of the ionic radius of $Zr^{+4}$ and the ionic radius of $Ma^{+3}$.

20. The method of claim 19, wherein the solid solution is selected from the group consisting of $Zr_{0.823}Y_{0.157}La_{0.01}Al_{0.01}O_{1.9115}$, $Zr_{0.798}Y_{0.152}La_{0.025}Al_{0.025}O_{1.899}$, and $Zr_{0.756}Y_{0.144}La_{0.05}Al_{0.05}O_{1.878}$.

* * * * *